Patented May 31, 1938

2,118,863

UNITED STATES PATENT OFFICE 2,118,863

MIXED POLYMERIZATION PRODUCTS

Walter Reppe, Ludwigshafen-on-the-Rhine, Werner Starck, Hofheim (Taunus), and Arthur Voss, Frankfort-on-the-Main-Hoechst, Germany, assignors to I. G. Farbenindustrie Aktiengesellschaft, Frankfort-on-the-Main, Germany No Drawing. Application May 12, 1936, Serial No. 79,268. In Germany March 5, 1932

4 Claims. (Cl. 260—2)

This invention relates to mixed polymerization products of a vinyl ester of an aliphatic carboxylic acid containing from 5 to 6 carbon atoms and another polymerizable organic substance and to a process of producing the same.

This application is a continuation-in-part of our copending application Ser. No. 658,146, filed February 23, 1933.

We have found that valuable products are obtained by subjecting to polymerization mixtures of a vinyl ester of an aliphatic carboxylic acid containing from 5 to 6 carbon atoms in the molecule and another polymerizable organic substance. Suitable vinyl esters of the said kind are for example valeric acid, isovaleric acid, caproic acid, alpha-methyl-valeric acid. As other polymerizable organic substances adapted to be interpolymerized with said vinyl esters may be mentioned vinyl esters of lower fatty acids, such as the vinyl esters of acetic acid, chloracetic acid, propionic acid and butyric acid; vinyl halides, such as vinyl bromide and especially vinyl chloride, styrene, acrylic esters, in particular methyl and ethyl esters of acrylic acid, esters of homologues of acrylic acid, such as alpha-methyl acrylic acid, acrylic nitrile, vinyl ketones, such as vinyl ethyl or vinyl normal-butyl ketones and diolefines, as for example butadiene.

The interpolymerization of vinyl esters of aliphatic carboxylic acids containing from 5 to 6 carbon atoms with the aforesaid substances capable of being polymerized may be effected by irradiation and/or heating. Known polymerization catalysts, such as oxygen in any form, as for example free oxygen, organic peroxides, as for example acetyl or benzoyl peroxides, or peracetic or perbenzoic acids, inorganic peroxides, as for example hydrogen peroxide or barium peroxide or other inorganic agents supplying oxygen, such as perborates or percarbonates, especially of alkali and alkaline earth metals, such as sodium, potassium, lithium, barium, calcium or strontium, silver oxide or ozone, may be added to the esters in order to accelerate the polymerization. The said catalysts are generally added in an amount of from about 0.1 to about 5, preferably from about 0.5 to about 2 per cent by weight of the said esters, if desired together with organic acids or acid anhydrides thereof, such as acetic anhydride, which latter are usually employed in a quantity of about 10 times the weight of the catalyst used. The polymerization by heating can be carried out by boiling the polymerization mixture in an open or closed vessel provided with a reflux condenser or by warming the mixture in a closed vessel without reflux. The time necessary for heating depends on the desired degree of polymerization and also upon the amount of the mixture to be polymerized, the desired degree being easily ascertained by drawing off a sample of the polymerized product from the vessel, the polymerization requiring usually at least half an hour. The reaction can also be carried out continuously, by continuously introducing monomeric compounds into the polymerization vessel at the rate at which the polymerization proceeds, the polymerized product being drawn off, preferably at the other end of the vessel. In this manner injurious overheating may be prevented. The said overheating may also be avoided by adding any polymerization catalyst employed in small portions only and providing sufficient time between the addition of each portion to allow the reaction mixture to cool down again to the desired temperature.

The polymerization may be carried out, if desired, in the presence of diluents, such as water, neutral aqueous solutions, such as neutral aqueous solutions of emulsifying agents, as for example of Turkey red oil or of alkylated naphthalene sulphonic acid sodium salts, weakly acid solutions, as for example dilute aqueous acetic acid, weakly alkaline solutions, as for example aqueous soap solutions, or inert gases, as for example carbon dioxide or nitrogen, if desired with the application of pressure in one or more stages, in the presence or absence of known polymerization regulators, as for example aldehydes such as salicyl aldehyde, which may also act as solvents if a larger amount thereof be employed and/or of organic solvents, as for example ethyl alcohol, benzene, methyl, ethyl or amyl acetate, chlorbenzene, carbon tetrachloride, chloroform, dichlorethylene, ketones, such as acetone and cyclohexanone, or nitrated hydrocarbons, such as nitrobenzene. The reaction mixture may also be polymerized in aqueous suspensions in the presence of emulsifiers and of the aforesaid polymerization catalysts. By subsequently hardening the resulting polymerization products at from 100° to about 120° C., products can be obtained which may advantageously be employed for the preparation of lacquers.

The properties of the polymerized products depend upon the nature of the initial materials and the conditions of polymerization. The mixed polymerization products of vinyl esters of aliphatic acids containing from 5 to 6 carbon atoms with vinyl esters of the fatty acids of lower molecular weight have a high resistance to water.

On the other hand, the softening point of interpolymerized products obtainable from mixtures of vinyl chloride, styrene or acrylic nitrile with the said vinyl esters of aliphatic acids containing from 5 to 6 carbon atoms is considerably lowered in comparison to that of polymerization products from vinyl chloride and the like alone, whereas the elasticity and thermoplasticity of the products is considerably improved.

If vinyl chloride, styrene or acrylic nitrile be employed in a comparatively small amount for the interpolymerization for example if vinyl esters of carboxylic acids containing from 5 to 6 carbon atoms be interpolymerized with, say, from about 0.5 to about 20 per cent by weight of one of the said polymerizable substances, the hardness and the softening points of the resulting interpolymerized products is increased with respect to that of the polymerization products resulting from vinyl esters of the said carboxylic acids alone.

The polymerization products may be employed as varnishes and lacquers, if desired together with cellulose derivatives compatible therewith, such as nitrocellulose and benzyl cellulose. The employment of mixtures of the said polymerization products with the said cellulose derivatives is very advantageous in the art of varnishes and lacquers because the films and coatings obtainable therefrom on surfaces of any kind, such as wood, metal, glass, paper, cardboard, leather or textile materials are very fast to light and stable to water. The polymerization products and the mixtures thereof with the aforesaid cellulose derivatives may be employed together with inert fillers, such as slate meal, carbon black or ground asbestos, with organic or inorganic pigments, such as white lead, colcothar, Indanthrene blue, Lithol red lakes, with organic dyestuffs soluble in the organic solvents employed for the preparation of the lacquers or varnishes, and/or with softening agents, such as phthalic esters, or neutral aryl phosphates.

The following examples will further illustrate how the invention may be carried out in practice but the invention is not restricted to these examples. The parts are by weight.

Example 1

130 parts of vinyl chloride and 30 parts of alpha-methyl valeric acid vinyl ester are emulsified in a pressure-tight vessel in 400 parts of water containing 8 parts of the sodium salt of hydroxyoctodecane sulphonic acid, 2 parts of sodium pyrophosphate and 0.5 part of potassium persulphate. The pH-value of the emulsion thus obtained ranges between 6 and 7. The emulsion is heated at 45° C. for about 24 hours. The polymerization is complete when the pressure decreases. The polymerization product is obtained in the form of a latex-like liquid which is coagulated by the addition of dilute aluminium sulphate solution. The precipitate thus obtained is heated in the presence of a small amount of dilute caustic soda solution at about 80° C., then cooled down to room temperature, washed with water and dried. A thermoplastic product is thus obtained which contains 76 per cent of vinyl chloride and has a softening point of about 65° C. It is soluble in halogenated hydrocarbons. It can be worked up into shaped articles in a similar manner as celluloid.

Example 2

A mixture of equal parts of isovaleric acid vinyl ester and acrylic acid methyl esters is polymerized in the manner described in Example 1 with the alternative that an open vessel is used, which is provided with a reflux condenser and that the mixture is heated to boiling. A soft tough product is obtained which is suitable for coating leather, fabrics, paper and the like.

Example 3

If in the mixture described in Example 2, methacrylic acid methyl ester be used instead of acrylic acid methyl ester, a hard product is obtained, which is soluble in the usual organic solvents and is suitable for lacquering purposes. It yields clear colorless films.

Example 4

A mixture of 90 parts of styrene and 10 parts of alpha-methyl valeric acid vinyl esters is polymerized in the manner described in Example 2 at a temperature of between 70° and 90° C. A product is obtained which is adapted for use in injection moulding and in the preparation of insulating varnishes for electrical purposes.

As emulsifying agent there may also be used the sodium salt of oleic acid, and hydrogen peroxide may also be employed as a polymerizing catalyst.

Example 5

A mixture of 250 parts of alpha-methyl valeric acid vinyl ester, 500 parts of vinyl chloride, 3000 parts of acetone and 20 parts of benzoyl peroxide is heated in a pressure-tight vessel at from 40° to 50° C. for about 45 hours while stirring or shaking. The polymerization is complete when the pressure decreases. A viscous solution is obtained which yields clear and colorless films after evaporating the solvent.

Instead of acetone, methylene chloride or a mixture of acetone and benzene may be employed as solvent.

What we claim is:

1. The process of producing mixed polymerization products which comprises subjecting to polymerization a mixture essentially comprising a vinyl ester of an aliphatic carboxylic acid containing from 5 to 6 carbon atoms and styrene.

2. A mixed polymerization product of a vinyl ester of an aliphatic carboxylic acid containing from 5 to 6 carbon atoms and styrene.

3. The process of producing mixed polymerization products which comprises subjecting to polymerization a mixture comprising essentially α-methylvaleric acid vinyl ester and styrene.

4. A mixed polymerization product of α-methylvaleric acid vinyl ester and styrene.

WALTER REPPE.
WERNER STARCK.
ARTHUR VOSS.